(12) United States Patent
Kienke et al.

(10) Patent No.: US 8,783,775 B2
(45) Date of Patent: Jul. 22, 2014

(54) LOCKING DEVICE, ESPECIALLY FOR AN ADJUSTMENT FITTING AND ESPECIALLY FOR A VEHICLE SEAT, AND VEHICLE SEAT

(75) Inventors: Ingo Kienke, Wermelskirchen (DE); Frank Weber, Odenthal (DE); Karthlkeyan S. Maharajapuram, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 449 days.

(21) Appl. No.: 13/125,790

(22) PCT Filed: Oct. 23, 2008

(86) PCT No.: PCT/EP2008/008978
§ 371 (c)(1),
(2), (4) Date: Jul. 19, 2011

(87) PCT Pub. No.: WO2010/045956
PCT Pub. Date: Apr. 29, 2010

(65) Prior Publication Data
US 2011/0266852 A1   Nov. 3, 2011

(51) Int. Cl.
*B60N 2/02* (2006.01)
*B60N 2/20* (2006.01)
*B60N 2/22* (2006.01)
*B60N 2/235* (2006.01)

(52) U.S. Cl.
USPC ...................................... 297/367 R; 297/366

(58) Field of Classification Search
USPC .............................. 297/366, 367 R
See application file for complete search history.

(56) References Cited

U.S. PATENT DOCUMENTS

| | | | | | |
|---|---|---|---|---|---|
| 4,103,964 | A | * | 8/1978 | Klingelhofer et al. | 297/367 R |
| 4,795,213 | A | * | 1/1989 | Bell | 297/367 R |
| 5,138,744 | A | * | 8/1992 | Coggon | 297/367 R X |
| 5,328,241 | A | * | 7/1994 | Haider | 297/367 R |
| 5,433,507 | A | * | 7/1995 | Chang | 297/367 R |
| 5,535,640 | A | * | 7/1996 | Qiu | 297/367 R X |
| 5,588,705 | A | * | 12/1996 | Chang | 297/367 R |
| 5,718,481 | A | * | 2/1998 | Robinson | 297/367 R |

(Continued)

FOREIGN PATENT DOCUMENTS

| | | |
|---|---|---|
| DE | 44 39 644 A1 | 6/1995 |
| DE | 10 2005 037 832 A1 | 8/2006 |
| JP | 64032656 | 3/1989 |
| JP | 2002315645 | 10/2002 |

OTHER PUBLICATIONS

Japanese Examination Report dated Feb. 26, 2013.

(Continued)

*Primary Examiner* — Rodney B White
(74) *Attorney, Agent, or Firm* — Fletcher Yoder, P.C.

(57) ABSTRACT

A locking device for an adjustment fitting of a vehicle seat includes a locking cam rotatable about a first rotational axis and a locking pawl rotatable about a second rotational axis. The locking device is settable into a locking position and a release position. The locking cam comprises one piece having a first locking region and a first safety region. The locking pawl has a second locking region and a second safety region. The first and second locking regions contact one another in the locking position of the device, and the first and second safety regions lie opposite one another or contact one another in the locking position.

13 Claims, 2 Drawing Sheets

(56) References Cited

U.S. PATENT DOCUMENTS

| | | | |
|---|---|---|---|
| 5,722,730 A * | 3/1998 | McKernan | 297/367 R X |
| 5,899,533 A * | 5/1999 | Tatematsu et al. | 297/366 X |
| 5,934,753 A * | 8/1999 | Lange | 297/367 R |
| 6,142,569 A * | 11/2000 | Kidokoro et al. | 297/366 |
| 6,273,508 B1 * | 8/2001 | Lange | 297/366 X |
| 6,598,938 B2 * | 7/2003 | Boltze et al. | 297/367 R |
| 6,659,558 B2 * | 12/2003 | Sugimoto | 297/366 X |
| 6,722,739 B2 * | 4/2004 | Klein et al. | 297/367 R |
| 6,827,403 B2 * | 12/2004 | Paasche et al. | 297/366 |
| 6,860,560 B2 * | 3/2005 | Chiu et al. | 297/366 X |
| 7,134,724 B2 * | 11/2006 | Chabanne et al. | 297/366 |
| 7,328,954 B2 * | 2/2008 | Sasaki et al. | 297/367 R X |
| 7,364,237 B2 * | 4/2008 | Grable et al. | 297/367 R X |
| 7,527,336 B2 * | 5/2009 | Kienke et al. | 297/374 |
| 7,571,962 B2 * | 8/2009 | Thiel et al. | 297/367 R |
| 7,604,297 B2 * | 10/2009 | Weber | 297/367 R |
| 8,070,231 B2 * | 12/2011 | Kienke et al. | 297/367 R |
| 8,109,573 B2 * | 2/2012 | Kienke et al. | 297/367 R |
| 8,109,574 B2 * | 2/2012 | Becker et al. | 297/367 R X |
| 8,123,297 B2 * | 2/2012 | Quast et al. | 297/366 |
| 8,146,995 B2 * | 4/2012 | Kienke et al. | 297/367 R |
| 8,186,759 B2 * | 5/2012 | Vedder | 297/367 R X |
| 8,388,068 B2 * | 3/2013 | Kienke et al. | 297/367 R |
| 2002/0050733 A1 * | 5/2002 | Hansel et al. | 297/367 |
| 2002/0089224 A1 | 7/2002 | Bruck et al. | |
| 2003/0025375 A1 * | 2/2003 | Gray | 297/367 |
| 2003/0042780 A1 * | 3/2003 | Klein et al. | 297/367 |
| 2003/0160490 A1 * | 8/2003 | Nock | 297/367 |
| 2004/0245816 A1 * | 12/2004 | Nock et al. | 297/367 X |
| 2005/0116521 A1 * | 6/2005 | Chabanne et al. | 297/366 |
| 2006/0170268 A1 * | 8/2006 | Nock et al. | 297/366 |
| 2006/0181131 A1 * | 8/2006 | Kienke et al. | 297/367 |
| 2007/0029858 A1 * | 2/2007 | Grable et al. | 297/378.1 |
| 2007/0170764 A1 * | 7/2007 | Thiel et al. | 297/367 |
| 2008/0122281 A1 * | 5/2008 | Weber | 297/366 |
| 2009/0108657 A1 * | 4/2009 | Becker et al. | 297/367 |
| 2009/0284063 A1 * | 11/2009 | Quast et al. | 297/366 |
| 2010/0096897 A1 * | 4/2010 | Kienke et al. | 297/367 R |
| 2010/0141007 A1 * | 6/2010 | Kienke et al. | 297/366 X |

OTHER PUBLICATIONS

International Search Report for application No. PCT/EP2008/008978 mailed Jul. 9, 2009.
Chinese Examination Report dated Jul. 18, 2013.

* cited by examiner

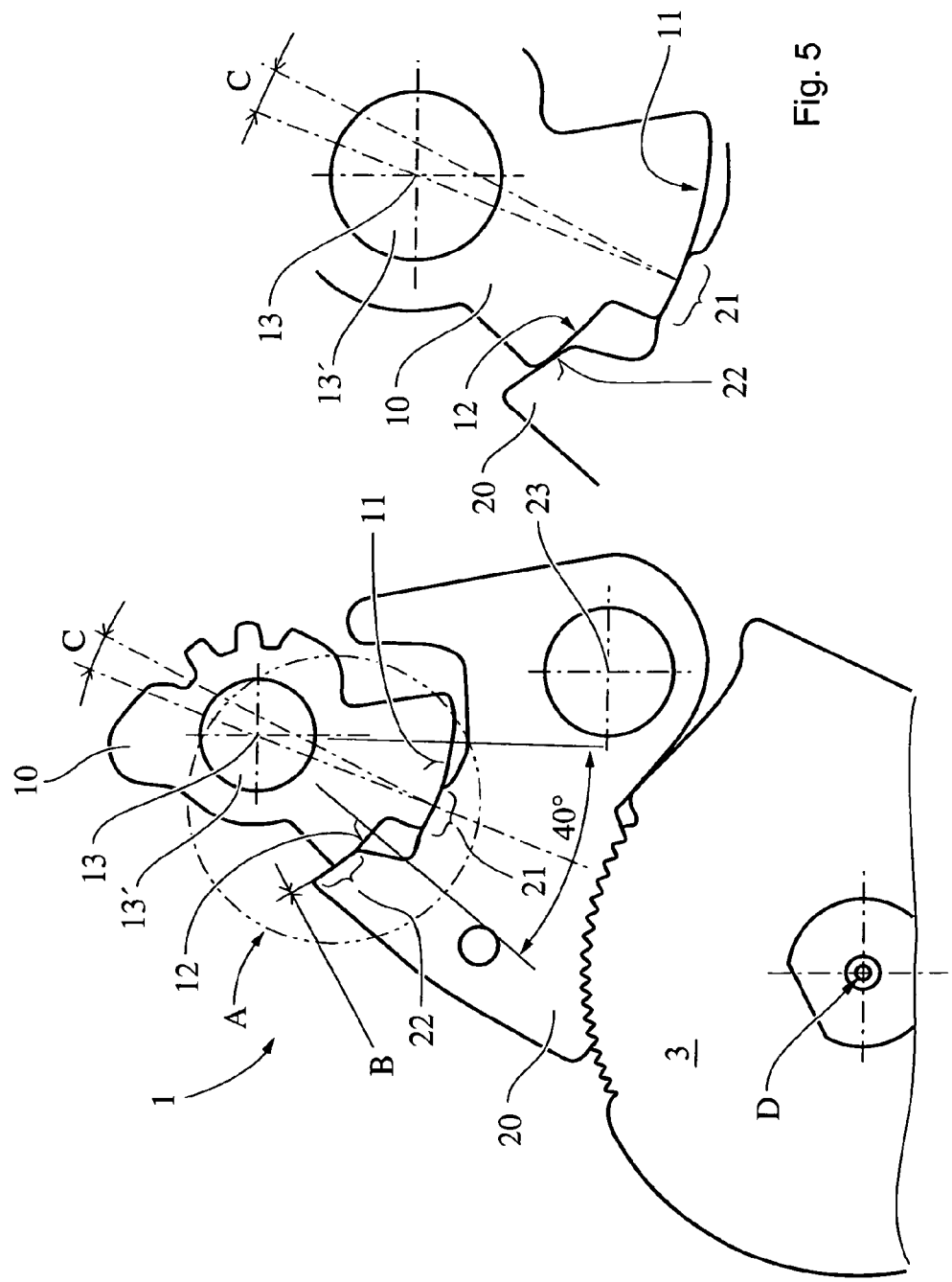

LOCKING DEVICE, ESPECIALLY FOR AN ADJUSTMENT FITTING AND ESPECIALLY FOR A VEHICLE SEAT, AND VEHICLE SEAT

CROSS REFERENCE TO RELATED APPLICATIONS

This application claims priority from and the benefit of PCT Application No. PCT/EP2008/008978, filed on Oct. 23, 2008 entitled "Locking Device, Especially for an Adjustment Fitting and Especially for a Vehicle Seat, and Vehicle Seat", which are herein incorporated by reference.

BACKGROUND

The present invention relates to a locking device, especially for an adjustment fitting and especially for a vehicle seat. By means of the locking device, it is possible to lock or to unlock an adjustment fitting, that is to say, in particular, to lock and to unlock the adjustment of a first fitting part of the adjustment fitting and a second fitting part of the adjustment fitting relative to one another.

Locking devices for vehicles, in particular for vehicle seats, have to withstand great loadings, in order not to open (or to unlock) unintentionally, in particular, in an accident situation and, as a result, to represent a risk for vehicle occupants. Secondly, however, locking devices for vehicles are also to be easy to operate in normal operating situations, that is to say those situations, in which no increased acceleration forces act on the vehicle, that is to say, in particular, to be unlockable in a pleasant way for a user, for example. To this end, it is proposed in document DE 44 39 644 C2 that a locking system for fittings of vehicle seats has an actuation and securing element which has a clamping face and a catching face. Since the clamping face and the catching face in each case act on the same mating face, this results in a comparatively great rotational movement for opening (or unlocking) the locking system. One alternative embodiment, in which the clamping face and the catching face of the actuation and securing element are formed in multiple pieces, entails the disadvantage of an increased production and material outlay.

SUMMARY

The invention is therefore based on the object of providing a locking device for locking or unlocking an adjustment fitting which provides very satisfactory safety with respect to unwanted or unsecured opening movements in an inexpensive way and nevertheless can be easily unlocked and can be mounted quickly and simply.

The invention is therefore based on the object of providing a locking device for locking or unlocking an adjustment fitting which provides very satisfactory safety with respect to unwanted or unsecured opening movements in an inexpensive way and nevertheless can be easily unlocked and can be mounted quickly and simply.

This object is achieved by a locking device, especially for an adjustment fitting and especially for a vehicle seat, the locking device having a locking cam which can be rotated about a first rotational axis and a locking pawl which can be rotated about a second rotational axis, it being possible for the locking device to be set into a locking position and into a release position, the locking cam having a first locking region and a first safety region, the locking cam being provided in one piece with the first locking region and the first safety region, the locking pawl having a second locking region and a second safety region, the first and second locking regions being provided in the locking position of the locking device so as to be in contact with one another, and the first and second safety regions being provided in the locking position of the locking device so as to lie opposite one another or to be in contact with one another. According to the invention, it is possible using simple means as a result to ensure satisfactory and reliable locking of the locking device, and nevertheless to combine easy unlockability with a comparatively simple construction and a comparatively low mounting outlay. Furthermore, according to the invention, in particular, what is known as the backward strength of the locking device is improved because, as a result of the locking regions and the safety regions, as it were no or a reduced tooth overlap loss of the locking pawl takes place, above all, in the backward direction.

Further preferred refinements of the invention are stated in the subclaims.

According to the invention, it is particularly preferred that, in the locking position of the locking device, the first and second safety regions are provided so as to lie opposite one another in a normal use situation (that is to say, a gap is provided between the first and second safety regions in a normal use situation) and are provided so as to be in contact with one another in an accident situation. Furthermore, it is preferred according to the invention that the first and second locking regions have a locking angle which lies between 4° and 6°, preferably between 4.5° and approximately 6°, particularly preferably between 5° and approximately 6°, very particularly preferably between approximately 5.2° and approximately 5.7°, or that the first and second safety regions (if the gap is closed by a loading) have a locking angle which lies between 2° and 5.7° or preferably between 2 and approximately 4.5°. As a result, operation of the locking device is possible which is particularly safe and at the same time easy to operate. The locking angle which is produced upon contact in the safety region is preferably smaller than the locking angle in the locking region. In the case of different tolerance conditions, however, the size of the gap between the safety regions is to vary only within defined limits, in order that the functional capability of the locking device is maintained.

Furthermore, it is preferred according to the invention that the first locking region and the first safety region are provided at different radial spacings from the first rotational axis. As a result, it is advantageously possible according to the invention to design the locking device to be particularly light and nevertheless stable. The locking travel and the unlocking travel of the locking device can therefore be particularly small according to the invention.

Furthermore, it is also particularly preferred according to the invention that the first locking region and the first safety region are provided in different sectors (that is to say, lying radially next to one another along the circumference) with regard to the first rotational axis. As a result, at the same time an overlap both of the locking regions and of the safety regions is made possible.

Furthermore, it is preferred according to the invention that the first and second locking regions and the first and second safety regions are provided for tolerance compensation in such a way that a rotation of the locking cam about the first rotational axis is provided in the range from a maximum of 10° to 20°. Here, this is applied to the difference between the extreme settings, that is to say between the situations for maximum material and minimum material (that is to say, the tolerance situation which leads to the maximum rotation for causing the locking in the use situation, cf. FIG. 3). For example, this can be realized by a tolerance zone of from ±5° to ±10° starting from the nominal situation (cf. FIG. 1). As a result, the individual parts of the locking device can be produced particularly simply and with low costs because the requirements for dimensional accuracy can be reduced.

A further subject matter of the present invention relates to a vehicle seat having a seat part, having a backrest part and having an adjustment fitting, a locking device according to the invention being provided as part of the adjustment fitting.

DRAWINGS

Exemplary embodiments of the invention are shown in the drawing and will be explained in greater detail in the following description. The figures do not restrict the general concept of the invention.

FIGS. 4 and 5 show illustrations of details of the locking device according to the invention.

DETAILED DESCRIPTION

Figure 1:
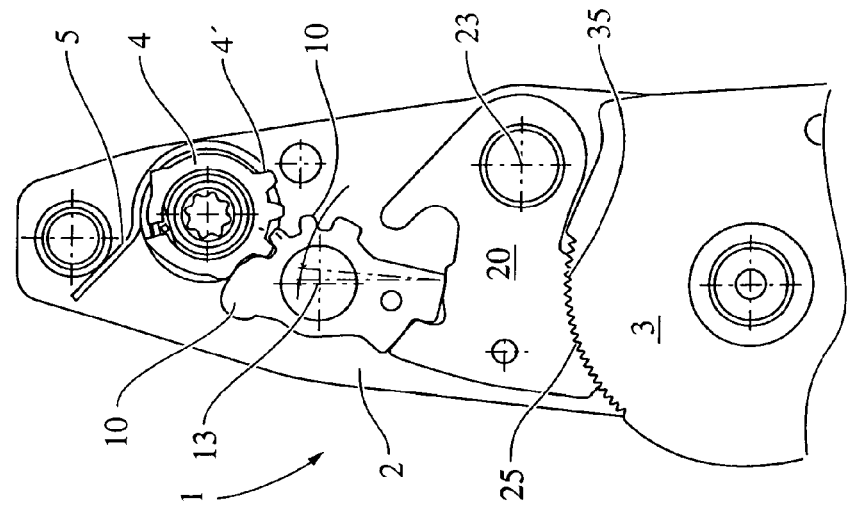
FIG. 1 shows a locking device according to the invention in its locking position, in side view.
Figure 2:
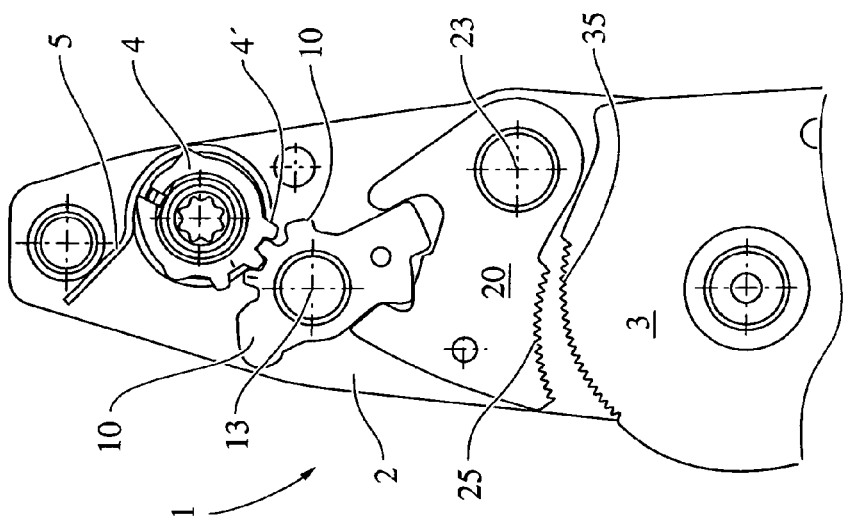
FIG. 2 shows the locking device according to the invention in its release position, in side view.
Figure 3:
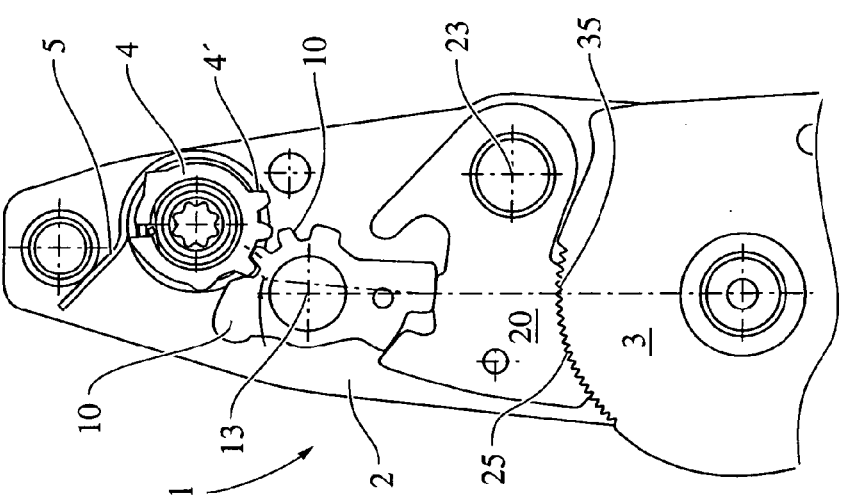
FIG. 3 shows a locking device according to the invention in its locking position, in side view, there being slightly different dimensions of the locking cam relative to the locking pawl in comparison with the illustration according to FIG. 1.

FIGS. 1 to 3 show a locking device 1 according to the invention, in side view. The locking device 1 has a locking cam 10 which is provided such that it can be rotated or pivoted about a first rotational axis 13. Furthermore, the locking device 1 has a locking pawl 20 which is provided such that it can be rotated or pivoted about a second rotational axis 23. The locking device 1 is, in particular, part of an adjustment fitting (not itself shown by means of a designation in the figures), the adjustment fitting comprising, in particular, a first fitting part 2 and a second fitting part 3 and being provided, for example, as a backrest adjustment fitting of a vehicle seat (not shown), a vehicle seat of this type having parts which can be moved relative to one another, for example a seat part and a backrest part, and in each case one of the fitting parts 2, 3 being attached to those parts of the vehicle seat which can be moved relative to one another. Both the locking cam 10 and the locking pawl 20 and the first and second rotational axes 13, 23 are then provided on the first fitting part 2. According to the invention, there is provision, in particular, for the first fitting part 2 to be attached to a backrest (not shown) and for the second fitting part 3 to be attached to a seat part (not shown), or vice versa. Here, the second fitting part 3 can be, in particular, a backrest part-side fitting element of a backrest adjustment fitting (what is known as a recliner) with a tumbling mechanism, that is to say the second fitting part 3 does not necessarily have to be provided fixed to the seat part (or rotationally fixed to the seat part). The locking device 1 secures, for example, a latching fitting for seat backrest adjustment. To this end, for example, the locking pawl 20 is configured with a first latching toothing system 25 and the second fitting part 3 is configured with a second latching toothing system 35. If the latching toothing is provided as a latching toothing system, the problems of the backward strength plays a rather subordinate role on account of the tooth height of the latching toothing system (in contrast to a latching toothing system shown in the figures for adjusting increments (comfort adjusting increments)). As an alternative to this, but not shown, the locking device 1 can also be provided for locking and unlocking a catching lock in the region of a vehicle seat, in particular for folding and latching the backrest or for folding and latching the seat part of a vehicle seat.

The locking device 1 can be set into a locking position which is shown in FIG. 1 and into a release position or unlocking position which is shown in FIG. 2. Between the locking position and the release position, the locking cam 10 is pivoted about the first rotational axis 13 and the locking pawl 20 is pivoted about the second rotational axis 23, in each case in an opposite rotational direction. In the illustration which is selected in FIGS. 1 to 5, in each case the locking pawl 20 is rotated in the clockwise direction for the direction from the locking position to the unlocking position (and vice versa), and the locking cam 10 is rotated in the counterclockwise direction for the direction from the locking position to the unlocking position (and vice versa).

FIGS. 4 and 5 show illustrations of details of the locking device 1 and of the locking cam 10 and the locking pawl 20 for setting in the locking position, FIG. 5 representing a detail denoted by "A" in FIG. 4 and FIG. 4 showing one example of a latching toothing system 25, 35 with adjusting increments. In a latching toothing system of this type, slight raising up of the locking pawl 20 (rotation in the clockwise direction according to FIG. 4) can already lead to a great reduction in strength, in particular for the case of loading in the backward direction, which is reduced effectively by the measures according to the invention.

The locking cam 10 has a first locking region 11 and a first safety region 12. The first locking region 11 and the first safety region 12 are arranged substantially behind one another in the circumferential direction about the first rotational axis 13. The locking pawl 20 has a second locking region 21 and a second safety region 22. In the locking position of the locking pawl 20, the second locking region 21 and the second safety region 22 are likewise arranged substantially behind one another in the circumferential direction about the first rotational axis 13. As a result, in the locking position, the first locking region 11 overlaps with the second locking region 21 and the first safety region 12 overlaps with the second safety region 22. In other words, both the first and second locking regions 11, 21 and the first and second safety regions 12, 22 in each case form surfaces with closing cams. According to the invention, there is provision here for the surfaces of the first and second locking regions 11, 21 to touch one another in the locking position, that is to say to be situated in contact with one another, and for the surfaces of the first and second safety regions 12, 22 to not touch one another in the locking position and in a normal use situation of the locking device 1 (that is to say without acceleration forces which are increased (for example, as a consequence of an accident) leading to loading of the locking device 1), but merely to lie opposite one another at a defined (comparatively small) spacing which is denoted by the designation B in FIG. 4. According to the invention, this spacing is, for example, from approximately 0.1 millimeter to approximately 1.0 millimeter, preferably from approximately 0.15 millimeter to approximately 0.5 millimeter, particularly preferably from approximately 0.2 millimeter to approximately 0.4 millimeter, very particularly preferably approximately 0.24 millimeter. The spacing which is provided in the normal situation between those surfaces of the safety regions 12, 22 which lie opposite one another has the advantage that no breakaway forces at all have to be applied between the safety regions 12, 22 (in a normal use situation), in order to set the locking device 1 into its release position or unlocking position. Contact between the safety regions 12, 22 occurs only in the case of relatively high loadings of the locking device 1 (in particular as a result of deformation of corresponding loaded components or parts), with the result that said safety regions 12, 22 contribute in situations of this type to increased stability of the locking device 1. On account of the arrangement of the second rotational axis 23 on one side of the connecting line (indicated merely in FIG. 4) between the first rotational axis 13 and the rotational axis (denoted by the designation D) of the first fitting part 2 about the second fitting part 3, according to the invention the holding force of the locking device is greater in one force direction than in the other force direction. In the figures, for example, a rotation of the first fitting part 2 to the left corresponds to a rotation of the backrest to the front; the strength in this rotational direction is also called the forward strength. Accordingly, the strength in the opposite rotational direction is called the backward strength. According to the invention, the backward strength is reinforced, in particular, by the provision of the safety regions. The figures in each case show the case where the first and second locking regions 11, 21 are provided closer to the connecting line than the safety regions 12, 22. According to the invention, however, it can also be provided the other way around (not shown). In particular, the first and the second locking regions 11, 21 are provided on the connecting line between the first rotational axis 13 and the rotational axis D of the first fitting part 2 about the second fitting part 3, or the connecting line intersects these regions.

There is preferably provision according to the invention for the first locking region 11 and the first safety region 12 to be situated radially at different spacings from the first rotational axis 13 (and also for the second locking region 12 and the second safety region 22 to be arranged correspondingly). As a result, increased overall stability of the locking device 1 can be realized.

There is provision according to the invention for the surfaces of the first and second locking regions 11, 21 (or their surface normals) to be provided relative, in particular, to the first rotational axis 13 in such a way that the result is a positive locking angle between the locking regions 11, 21. This is shown by the designation C in FIGS. 4 and 5. The locking angle is the angle between firstly the connecting line of the contact point (or touching point) of the first and second locking regions 11, 21 and secondly the surface normal of the second locking region 21. A positive locking angle between the locking regions 11, 21 results in an opening moment between the locking cam and the locking pawl 20 in the case of a loading, which leads to as low a breakaway moment as possible being achieved (for setting the release position).

There is also a further locking angle (not shown in the figures) in the region of the safety regions 12, 22. According to the invention, this further locking angle is also of, in particular, positive configuration. This also leads to an opening moment between the locking cam and the locking pawl 20 in the case of a loading. The opening of the locking device 1 (or the setting of the release position) can be suppressed effectively by measures such as the formation of grooves or projecting lugs in the region between the locking cam 10 and a pin 13' which forms the first rotational axis 13.

In order to set the release position starting from the locking position, in particular, an actuating element 4 (shown merely in FIG. 1) is provided according to the invention which is prestressed by a spring 5 (shown merely in FIG. 1) into a position which corresponds to the locking position of the locking cam 10. (This direction, in which the actuating element 4 is prestressed by the spring 5, corresponds according to the illustration in the drawings to a direction counter to the clockwise direction). To this end, the actuating element 4 has a toothing system 4' (shown merely in FIG. 1) which meshes with a mating toothing system 10' (shown merely in FIG. 1) of the locking cam 10.

FIG. 3 shows a locking device 1 according to the invention in side view, there being slightly different dimensions of the locking cam 10 relative to the locking pawl 20 in comparison with the illustration according to FIG. 1, on account of the overall tolerance situation. Changes of this type to the dimensions can be ascribed to the tolerances produced during production. According to the invention, despite these tolerances, secure locking of the locking device can be ensured.

LIST OF REFERENCE SYMBOLS

1 Locking device
2 First fitting part
3 Second fitting part
4 Actuating element
4' Toothing system
5 Spring
10 Locking cam
10' Mating toothing system
11 First locking region
12 First safety region
13 First rotational axis
13' Pin
20 Locking pawl
21 Second locking region
22 Second safety region
23 Second rotational axis
25 First latching toothing system
35 Second latching toothing system
A Detail from FIG. 4
B Spacing between the safety regions
C Locking angle between the locking regions
D Rotational axis of the first fitting part

The invention claimed is:

1. A locking device for an adjustment fitting of a vehicle seat, the locking device comprising a locking cam rotatable about a first rotational axis relative to a fitting part of the adjustment fitting, and a locking pawl rotatable about a second rotational axis relative to the fitting part of the adjustment fitting, the locking device being settable into a locking position and a release position, the locking cam comprising one piece having a first locking region and a first safety region, non-overlapping with the first locking region, wherein the locking pawl has a second locking region and a second safety region, non-overlapping with the second locking region, the first and second locking regions contact one another at a locking angle in the locking position of the locking device, the first and second locking regions are provided on a connecting line between the first rotational axis and a third rotational axis of the fitting part while the locking device is in the locking position, and while the locking device is in the locking position, the first and second safety regions are positioned opposite one another and are separated by a gap in a normal use situation and are configured to contact one another in an accident situation;
    wherein the first and second locking regions and the first and second safety regions are disposed for tolerance compensation with rotation of the locking cam about the first rotational axis limited to a maximum of 20°.

2. The locking device as claimed in claim 1, wherein the locking angle is between 4° and approximately 6°.

3. The locking device as claimed in claim 2, wherein the locking angle is between 4.5° and approximately 6°.

4. The locking device as claimed in claim 2, wherein the locking angle is between 5° and approximately 6°.

5. The locking device as claimed in claim 2, wherein the locking angle is between 5.2° and approximately 5.7°.

6. The locking device as claimed in claim 1, wherein the first and second safety regions are configured to contact one another at a second locking angle between 2° and approximately 5.7°.

7. The locking device as claimed in claim 6, wherein the second locking angle is between 2° and approximately 4.5°.

8. The locking device as claimed in claim 1, wherein the first locking region and the first safety region are disposed at different radial spacings from the first rotational axis.

9. The locking device as claimed in claim 1, wherein the first locking region and the first safety region are disposed in different sectors with regard to the first rotational axis.

10. The locking device as claimed in claim 1, wherein the locking cam is spring preloaded, and prestressed into the locking position.

11. A vehicle seat having a seat part, comprising a backrest part, the adjustment fitting, and the locking device as claimed in claim 1.

12. The locking device as claimed in claim 1, wherein the first and second locking regions and the first and second safety regions are disposed for tolerance compensation with rotation of the locking cam about the first rotational axis limited to a maximum of 15°.

13. The locking device as claimed in claim 1, wherein the first and second locking regions and the first and second safety regions are disposed for tolerance compensation with rotation of the locking cam about the first rotational axis limited to a maximum of 10°.

* * * * *